US009720530B2

(12) United States Patent
Cho et al.

(10) Patent No.: US 9,720,530 B2
(45) Date of Patent: Aug. 1, 2017

(54) PORTABLE DEVICE PROVIDING A REFLECTION IMAGE AND METHOD OF CONTROLLING THE SAME

(71) Applicant: LG ELECTRONICS INC., Seoul (KR)

(72) Inventors: Eunhyung Cho, Seoul (KR); Sinae Chun, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 290 days.

(21) Appl. No.: 13/875,075

(22) Filed: May 1, 2013

(65) Prior Publication Data

US 2014/0300533 A1    Oct. 9, 2014

(30) Foreign Application Priority Data

Apr. 4, 2013    (KR) .................. 10-2013-0036930

(51) Int. Cl.
| | | |
|---|---|---|
| *G06F 3/041* | (2006.01) | |
| *G06F 3/14* | (2006.01) | |
| *G06F 3/0485* | (2013.01) | |
| *G09G 3/00* | (2006.01) | |
| *G06F 1/16* | (2006.01) | |

(52) U.S. Cl.
CPC ............ *G06F 3/041* (2013.01); *G06F 1/1626* (2013.01); *G06F 1/1637* (2013.01); *G06F 1/1647* (2013.01); *G06F 3/0485* (2013.01); *G06F 3/1423* (2013.01); *G06F 2200/1637* (2013.01); *G09G 3/001* (2013.01); *G09G 2340/0492* (2013.01)

(58) Field of Classification Search
CPC ...... G06F 1/1626; G06F 1/1647; G06F 1/165; G06F 1/1652; H04M 1/0268; H04M 2250/12; H04M 2250/16
See application file for complete search history.

(56) References Cited

U.S. PATENT DOCUMENTS

| | | | |
|---|---|---|---|
| 6,614,650 B2 | 9/2003 | Tabata | |
| 6,697,083 B1 | 2/2004 | Yoon | |
| 8,233,033 B2 | 7/2012 | Aarts et al. | |
| 2001/0016508 A1 | 8/2001 | Kido et al. | |
| 2006/0146011 A1* | 7/2006 | Pihlaja ................ | H04M 1/0216 345/156 |
| 2008/0146285 A1* | 6/2008 | Lee ..................... | H04M 1/0266 455/566 |

(Continued)

FOREIGN PATENT DOCUMENTS

| | | |
|---|---|---|
| EP | 3 041 147 A1 | 7/2016 |
| KR | 10-2001-0109814 A | 12/2001 |

*Primary Examiner* — Nalini Mummalaneni
(74) *Attorney, Agent, or Firm* — Birch, Stewart, Kolasch & Birch, LLP

(57) ABSTRACT

According to one embodiment of the present specification, if a notification is generated, a method of controlling a portable device includes the steps of sensing a state of the portable device using a sensor unit, if the portable device is in a first state, displaying content of the notification in a first display area or a second display area of a display unit and if the portable device is in a second state, displaying the content of the notification in the second display area of the display unit in a manner of reversing a left and right of the content of the notification.

17 Claims, 8 Drawing Sheets

(56) References Cited

U.S. PATENT DOCUMENTS

| | | |
|---|---|---|
| 2010/0029327 A1 | 2/2010 | Jee |
| 2010/0060548 A1 | 3/2010 | Choi et al. |
| 2011/0111809 A1* | 5/2011 | Matsuo ............. H04M 1/72569 |
| | | 455/566 |
| 2011/0242103 A1 | 10/2011 | Han et al. |
| 2012/0172093 A1* | 7/2012 | Cathey et al. ................ 455/566 |
| 2013/0002133 A1 | 1/2013 | Jin et al. |
| 2013/0044240 A1* | 2/2013 | Leskela et al. ............... 348/239 |
| 2013/0076649 A1* | 3/2013 | Myers et al. ................. 345/173 |
| 2013/0178248 A1* | 7/2013 | Kim .............................. 455/566 |
| 2014/0132481 A1* | 5/2014 | Bell et al. ...................... 345/1.3 |
| 2014/0146304 A1* | 5/2014 | Almalki .......................... 356/51 |

* cited by examiner

PORTABLE DEVICE PROVIDING A REFLECTION IMAGE AND METHOD OF CONTROLLING THE SAME

This application claims the benefit of the Korean Patent Application No. 10-2013-0036930, filed on Apr. 4, 2012, which is hereby incorporated by reference as if fully set forth herein.

BACKGROUND OF THE INVENTION

Field of the Invention

The present specification relates to a portable device, more particularly, to a portable device providing a displayed image or a reflected image to a user according to a state of the portable device.

Discussion of the Related Art

In general, a portable device is light and small. Thus, a user can use the portable device whenever it is necessary in a manner of positioning the portable device in the immediate vicinity of the user. The portable device can be positioned near the user in a variety of forms. The user may be able to set the portable device on the edge on a holder or lay on a floor. And, the user may put the portable device in a manner that a front side of the portable device faces upwards to make a display unit of the portable device to be seen. Or, the user may be able to turn the front side of the portable device face down to make the display unit not to be seen.

If a message is received or a notification is generated when the portable device is upside down, there exists inconvenience for the user to pick up the portable device and to look at the display to check the message or the notification.

SUMMARY OF THE INVENTION

Accordingly, the present specification intends to provide a portable device providing a content to a user using a reflection image and a method of controlling the same. In particular, according to the present specification, it is necessary for the portable device to provide a method of enhancing visibility of a reflected image.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these and other advantages and in accordance with the purpose of the present specification, as embodied and broadly described, according to one embodiment a portable device includes a display unit configured to display a digital information including a first display area situated at a front of the portable device and a second display area situated at a side of the portable device, a sensor unit configured to sense a state of the portable device, and a controller configured to control the display unit and the sensor unit. If a notification is generated, the controller is configured to sense the state of the portable device using the sensor unit. If the portable device is in a first state, the controller is configured to display content of the notification in the first display area or the second display area of the display unit and if the portable device is in a second state, the controller is configured to display the content of the notification in the second display area in a manner of reversing a left and right of the content of the notification.

To achieve these and other advantages and in accordance with the purpose of the present specification, as embodied and broadly described, according to one embodiment, if a notification is generated, a method of controlling a portable device includes the steps of sensing a state of the portable device using a sensor unit, if the portable device is in a first state, displaying content of the notification in a first display area or a second display area of a display unit and if the portable device is in a second state, displaying the content of the notification in the second display area of the display unit in a manner of reversing a left and right of the content of the notification.

Advantageous Effects

According to the present specification, a portable device may be able to display a content of a notification in a side display.

According to the present specification, a portable device senses a state of the portable device and may be then able to provide a reflected image to a user in a manner of reflecting a content in an object according to the sensed state.

According to the present specification, when a reflected image is provided to a user, a portable device may be able to display a displayed content in a manner of left-right reversing.

According to the present specification, a portable device senses a texture of a reflector and may be then able to control a size of a displayed content in response to the texture.

According to the present specification, a portable device may be able to control a scroll direction of a displayed content according to a state of a sensed portable device.

According to the present specification, a portable device may be able to display a content in a manner of controlling the content to enhance visibility and readability of a reflection image.

It is to be understood that both the foregoing general description and the following detailed description are exemplary and explanatory and are intended to provide further explanation of the specification as claimed

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings.

DETAILED DESCRIPTION OF THE INVENTION

In the following description, embodiments are explained in detail with reference to the attached drawings and the contents written on them. A scope intended to claim may be non-limited or non-restricted by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

In the present specification, a portable device may include at least one selected from the group consisting of a smartphone, a smart pad, a music player, a tablet computer, and a note book. In the present specification, a portable device may be able to include a display area in the front and the side of the portable device, respectively.

Figure 1:
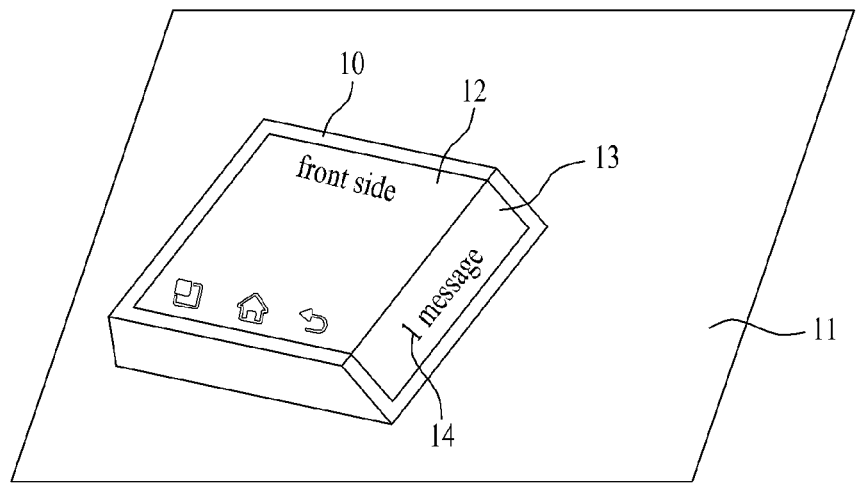
FIG. 1 is a diagram of a portable device according to one embodiment of the present specification.
Figure 1:
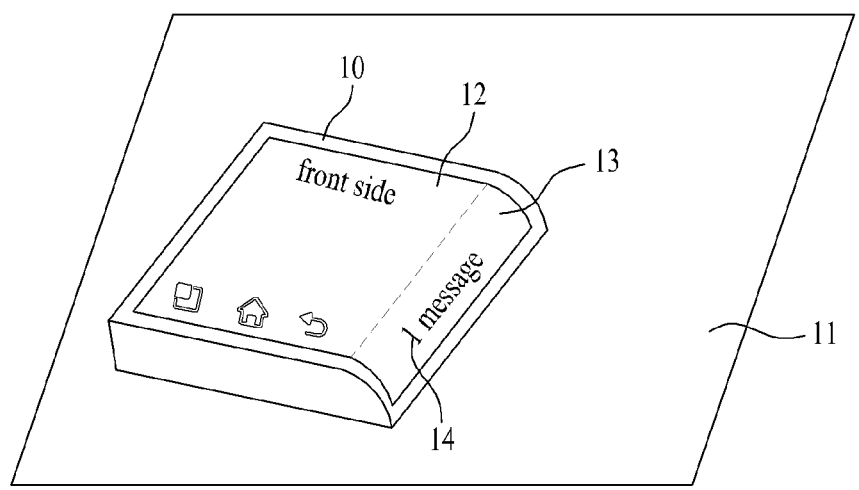

FIG. 1 is a diagram of a portable device according to one embodiment of the present specification. The portable device 10 can be held by a hand of a user or put on a different object 11. As shown in FIG. 1, a state that a front of the portable device is laid in a manner of facing upwards or a display area positioned in the front of the portable device is facing the user can be defined as a first state of the portable device. The portable device may include a first display area 12 in the front and may include a second display area 13 in the side of the portable device. In this case, the first display area 12 may be able to include a wider display area compared to the second display area 13.

The portable device may be able to include the first display area 12 and the second display area 13 distinguished by at least one edge of the portable device as shown in the top of FIG. 1. An internal angle between the first display area 12 and the second display area 13 may have a value greater than 90 degrees and less than 180 degrees. As a different embodiment, the portable device may be able to include a second display area 13 in a form of a curved surface connected to the first display area 12 as shown in the bottom of FIG. 1. The second display area 13 can be positioned at the side of the portable device in a manner of being connected to the first display area 12 without a boundary line.

In case that a notification is generated, the portable device 10 may be able to display a content of the notification in at least one of the first display area 12 and the second display area 13. The portable device may be able to display a detail content of the notification in the first display area and a summary content 14 of the notification in the second display area 13. The portable device may be able to display the detail content of the notification in the second display area as well. In this case, the portable device may be able to provide the detail content of the notification to the user in a manner of scrolling the content displayed in the second display area. The operation of displaying the content by scrolling performed by the portable device shall be described in FIG. 5 and FIG. 6.

Figure 2:
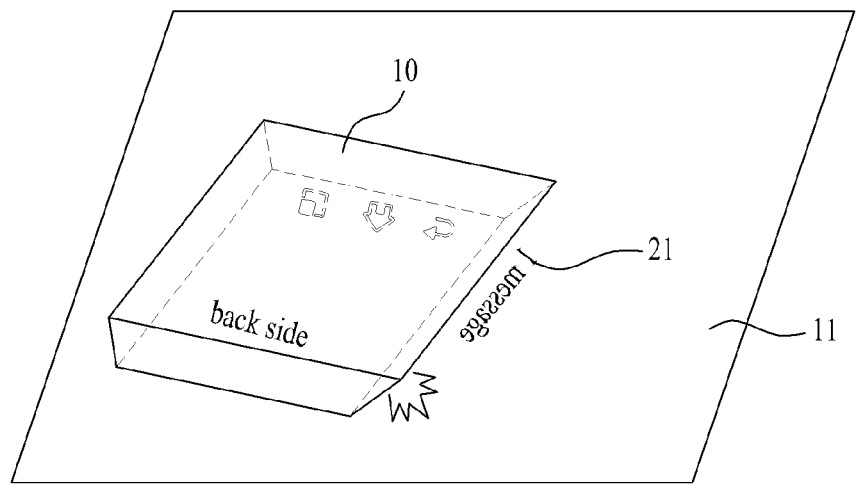
FIG. 2 is a diagram of a portable device providing a reflection image according to one embodiment of the present specification.
Figure 2:
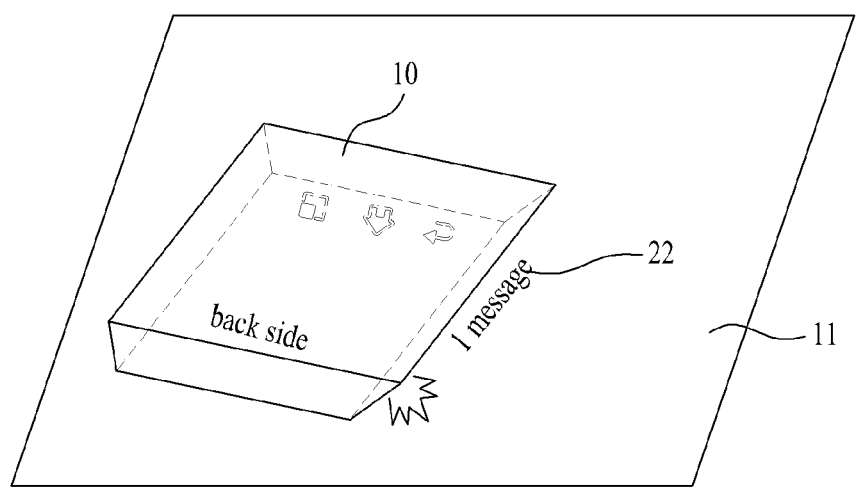

FIG. 2 is a diagram of a portable device providing a reflection image according to one embodiment of the present specification. The portable device 10 may be laid on an object 11 in a manner of being upside down. As shown in the top of FIG. 2, a state that a front of the portable device is laid in a manner of facing downwards or a display area positioned in the front of the portable device is not facing the user can be defined as a second state of the portable device. The portable device may be able to temporarily maintain the first display area 12 as an inactive state in the second state. The portable device may be able to display the content of the notification using the second display area 13. The second display area of the portable device is positioned at the side of the portable device and an internal angle between the first display area 12 and the second display area 13 may have a value greater than 90 degrees and less than 180 degrees. Hence, the content displayed in the second display area can be reflected in the object 11 by the portable device. In this case, if the portable device maintains the content displayed in the second display area as it is in the first state, a first reflection image 21 reflected in the object may indicate a result that a left and right of the content are reversed. The first reflection image 21 reflected in the object 11 can be checked by a vision of the user as of a state that the left and right of the content are reversed.

The portable device may be able to display the content displayed in the second display area in the first state by reversing the left and the right of the content in the second state as shown in the bottom of FIG. 2. The left-right reversed content is reflected in the object 11 by the portable device and the portable device may be then able to provide it to the user. By doing this, the user may be able to check a second reflection image 22, which is reflected in the object and not reversed the left and the right of the content, with the vision of the user. As mentioned in the foregoing description, the portable device senses a state of the portable device and may be then able to provide the content of a notification to the user using a content displayed in the second display area in the first state and using a reflection image, which is generated by reflecting a content displayed in the second display area in a surrounding object, in the second state.

Figure 3:
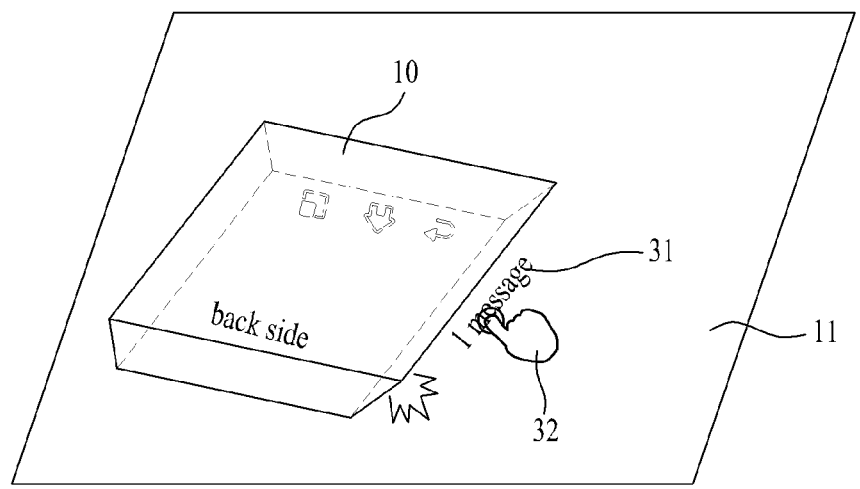
FIG. 3 is a diagram of an operating method of a portable device using a reflection image according to one embodiment of the present specification.
Figure 3:
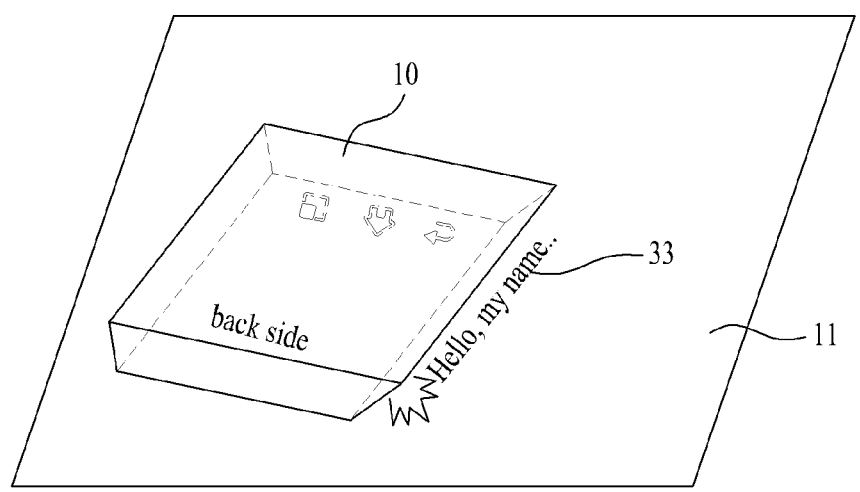

FIG. 3 is a diagram of an operating method of a portable device using a reflection image according to one embodiment of the present specification. The portable device may be able to detect a control input 32 controlling a second reflection image 31 in the second state as shown in the top of FIG. 3. The portable device may be able to detect the control input controlling the reflection image 31 using a sensor unit. In this case, the control input may include at least one selected from the group consisting of a touch input by a hand of a user, a voice input, and a gesture input. The portable device may be able to detect the control input using at least one selected from the group consisting of a proximity sensor, a light sensor, a microphone, and a camera included in the sensor unit.

The portable device may be able to display the detail content of the notification in response to the control input 32 controlling the second reflection image 31. As described in the bottom of FIG. 2, the portable device may be able to display the detail content of the notification in a manner of reversing the left and right of the detail content of the notification. The left-right reversed detail content, which is displayed in the second display area, can be reflected in the object 11 by the portable device as a third reflection image 33. By doing this, the user checks the third reflection image 33 with vision and may be then able to identify the detail content of the notification. And, as a different embodiment, the portable device may be able to display a next content or delete a content currently displayed in response to the control input.

Figure 4:
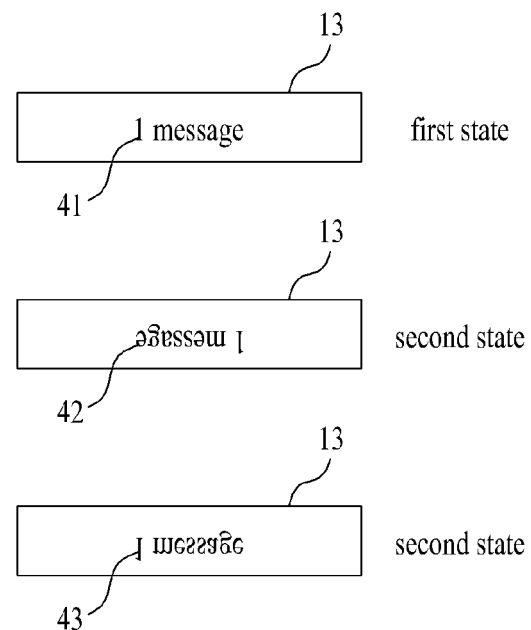
FIG. 4 is a diagram of a method of displaying a content according to a state of a portable device according to one embodiment of the present specification.

FIG. 4 is a diagram of a method of displaying a content according to a state of a portable device according to one embodiment of the present specification. FIG. 4 indicates a side view of the portable device. Referring to the top of FIG. 4, the portable device in the first state may be able to display the content of the notification in the second display area 13 without reversing the left and right of the content of the notification or reversing the top and bottom of the content of the notification. An image displayed by the portable device in the first state can be defined as a first image 41.

The portable device may be able to detect that the portable device is upside down as shown in FIG. 2. The portable device may be able to sense that a state of the portable device corresponds to the second state using a sensor unit. If the portable device in the second state maintains the first image displayed in the second display area 13 in the first state as it is, the content of the notification can be identified by the user as a second image 42, which is the image reversed the top and bottom and the left and right of the first image, as shown in the middle of FIG. 4. If the second image 42 displayed in the second display area 13 is reflected in the object by the portable device, the user may be able to check the first reflection image 21 of FIG. 2 with a vision. Since the first reflection image corresponds to a state that the left and right of the content of the notification is reversed, it is difficult for the user to check the content of the notification via the first reflection image.

The portable device may be able to display a third image 43 in the second display area 13 in a manner of reversing the left and right of the content of the notification in the second state. The third image 43 can be reflected in the object by the portable device. The second reflection image 22, which is the third image 43 reflected in the object, can be displayed as shown in the bottom of FIG. 2. In particular, the second reflection image 22 can be identified by the user similar to a case that the portable device in the first state displays the first image 41 in the second display area. In particular, the portable device may be able to provide the user with the content of the notification, which is not reversed the top and bottom or the left and right of the content of the notification, irrespective of the first state and the second state. In particular, the portable device in the second state may be able to provide the user with the content, which is not reversed the top and bottom or the left and right of the content, in a manner of reversing the left and right of content of the notification and then reflecting it in the object.

Figure 5:
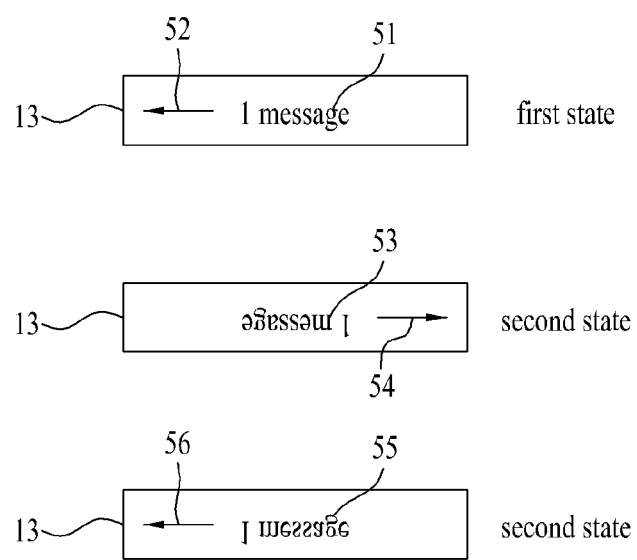
FIG. 5 is a diagram of a method of determining a scroll direction of a content according to one embodiment of the present specification.

FIG. 5 is a diagram of a method of determining a scroll direction of a content according to one embodiment of the present specification. FIG. 5 indicates a side view of the portable device. Referring to the top of FIG. 5, the portable device in the first state may be able to display the content of the notification in the second display area 13 without reversing the left and right or the top and bottom of the content of the notification. By doing this, a user may be able to identify the content of the notification in the second display area of the portable device. An image displayed by the portable device in the first state can be defined as a first image 51. In case that a whole content of the notification cannot be displayed in the second display area 13 at one time, the portable device may be able to display a part of the content in the second display area 13 as the first image 51. The portable device may be able to display the whole content of the notification in a manner of scrolling the first image 51 displayed in the second display area 13. Referring to the top of FIG. 5, the portable device may be able to display the whole content of the notification in a manner of scrolling the displayed first image in a first direction 52.

In this case, the first direction can be determined in response to a direction to which a user reads a text. For instance, if a displayed content corresponds to an English text, the portable device may be able to display the whole content of the notification in a manner of scrolling the first image 51 in a left direction.

The portable device may be able to detect that the portable device is upside down as shown in FIG. 2. The portable device may be able to sense that a state of the portable device corresponds to the second state using a sensor unit. As shown in the middle of FIG. 5, a second image 53 displayed in the portable device in the second state can be identified by the user as an image that the left and right and the top and bottom of the first image is reversed. If the second image displayed in the second display area 13 is reflected in the object by the portable device, as described in FIG. 2, the user may be able to check the first reflection image 21 with vision. Since the first reflection image 21 corresponds to a state that the left and right of the content of the notification is reversed, it is difficult for the user to check the content of the notification via the first reflection image 21. In particular, the first reflection image 21 has a low visibility.

And, the portable device may be able to scroll the second image 53. As shown in the middle of FIG. 5, if the portable device in the second state maintains the first scroll direction 52, the user may be able to identify that the content moves to a second scroll direction 54 since the portable device is in the second state, which corresponds to a state that the portable device is upside down. The second scroll direction can be an opposite direction to the first scroll direction 52, which scrolls the content displayed in the first state. Since the second scroll direction is applied to the first reflection image 21, even in case that the user looks at the first reflection image 21, the first reflection image 21 can be scrolled in the opposite direction of the first scroll direction 52. Hence, the user may feel uncomfortable when the user reads a text, since the direction of reading the text has changed. In order to solve the inconvenience, the portable device may be able to change a method of displaying an image and a scroll direction in the second state.

The portable device may be able to display a third image 55 in the second display area 13 in the second state in a manner of reversing the left and right of the content of the notification. The third image can be reflected in the object by the portable device. As shown in the bottom of FIG. 2, the second reflection image, which is the third image 55 reflected in the object, can be identified by the user similar to a case that the portable device in the first state displays the first image in the second display area. In particular, the portable device may be able to provide the user with the content of the notification, which is not reversed the top and bottom or the left and right of the content of the notification, irrespective of the first state and the second state. In particular, the portable device in the second state may be able to provide the user with the content, which is not reversed the top and bottom or the left and right of the content, in a manner of reversing the left and right of the content of the notification and then reflecting it in the object. And, the portable device may be able to scroll the third image 55 in a third scroll direction 56 in the second state. By doing this, the portable device may be able to provide to the user with a content scrolled in the same direction of the first scroll direction 52 scrolling the content displayed in the first state. In this case, the third scroll direction 56 recognized by the user may be identical to the first scroll direction 52. Yet, since the state of the portable device in the first state and the state of the portable device in the second state are different from each other, the second scroll direction 54 for the portable device may be opposite to the first scroll direction 52. Hence, the user may be able to read the naturally scrolled content, since the direction of reading the text has not changed.

As mentioned in the foregoing description, the portable device in the second state may be able to provide to the user with the content of not reversed the left and right or the top and bottom of the content in a manner of reversing the left and right of the content of the notification and then reflecting it in the object. And, the portable device may be able to enable the user to naturally read the reflected content in a manner of changing the scroll direction of the displayed content.

Figure 6:
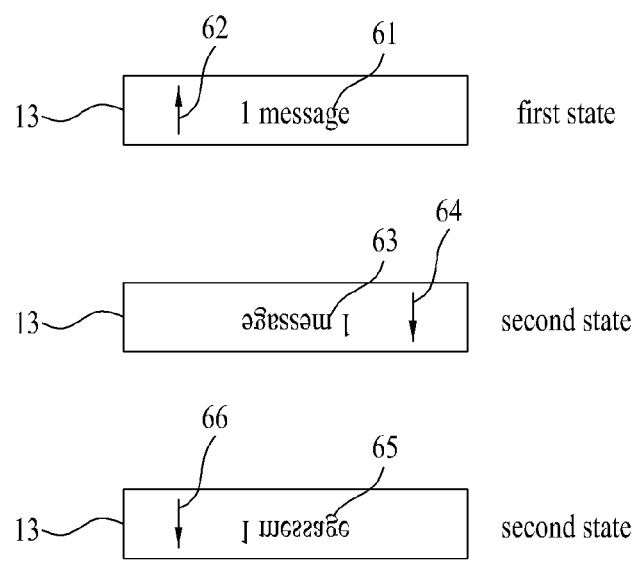
FIG. 6 is a diagram of a method of determining a scroll direction of a content according to a different embodiment of the present specification.

FIG. 6 is a diagram of a method of determining a scroll direction of content according to a different embodiment of the present specification. FIG. 6 indicates a side view of the portable device. Referring to the top of FIG. 6, the portable device in the first state may be able to display the content of the notification in the second display area 13 without any reversing. By doing this, a user may be able to identify the content of the notification in the second display area of the portable device. An image displayed by the portable device in the first state can be defined as a first image 61. In case that a whole content of the notification cannot be displayed in the second display area 13 at one time, the portable device may be able to display a part of the content in the second display area 13 as the first image 61. The portable device may be able to display the whole content of the notification in a manner of scrolling the first image 61 displayed in the second display area 13. Referring to the top of FIG. 6, the portable device may be able to display the whole content of the notification in a manner of scrolling the displayed first image in a first direction 62, which is upward.

The portable device may be able to detect that the portable device is upside down as shown in FIG. 2. The portable device may be able to sense that a state of the portable device corresponds to the second state using a sensor unit. As shown in the middle of FIG. 6, a second image 63 displayed in the portable device in the second state can be identified by the user as an image that the left and right and the top and bottom of the first image is reversed. If the second image 63 displayed in the second display area 13 is reflected in the object by the portable device, as described in FIG. 2, the user may be able to check the first reflection image 21 with vision. Since the first reflection image 21 corresponds to a state that the left and right of the content of the notification is reversed, it is difficult for the user to check the content of the notification via the first reflection image 21. In particular, the first reflection image 21 has a low visibility.

And, the portable device may be able to scroll the second image 63. As shown in the middle of FIG. 6, the user may be able to look at the second image 63 displayed in the second display unit 13. In this case, if the portable device in the second state maintains the first scroll direction 62, the user may be able to identify that the second image 63 moves to a second scroll direction 64 since the portable device is in the second state, which corresponds to a state that the portable device is upside down. The second scroll direction 64 can be an opposite direction to the first scroll direction 62, which scrolls the content displayed in the first state. Yet, if the user looks at the first reflection image 21, the first reflection image 21 can be scrolled in the first scroll direction 62. Since the first reflection image 21 is the result of reflection of the second image 63, both the first scroll direction 62 scrolling the first image in the first state and the scroll direction scrolling the first reflection image 21 in the second state can be identified by the user identically. Hence, the portable device may be able to maintain the scroll direction of images.

The portable device may be able to display a third image 65 in the second display area 13 in the second state in a manner of reversing the left and right of the content of the notification. The third image can be reflected in the object by the portable device. As shown in the bottom of FIG. 2, the second reflection image 22, which is the third image 65 reflected in the object, can be identified by the user similar to a case that the portable device in the first state displays the first image 61 in the second display area. In particular, the portable device may be able to provide the user with the content of the notification, which is not reversed the top and bottom or the left and right of the content of the notification, irrespective of the first state and the second state. In particular, the portable device in the second state may be able to provide the user with the content, which is not reversed the top and bottom or the left and right of the content, in a manner of reversing the left and right of the content of the notification and then reflecting it in the object. And, the portable device may be able to scroll the third image 65 in a third scroll direction 66 in the second state. By maintaining the first scroll direction 62 scrolling the content displayed in the first state in the second state as well, the portable device may be able to provide to the user with the content capable of being scrolled in the same scroll direction. Hence, the user may be able to read the naturally scrolled content, since the direction of reading a text has not changed.

As mentioned in the foregoing description, the portable device in the second state may be able to provide to the user with the content of not reversed the left and right or the top and bottom of the content in a manner of reversing the left and right of the content of the notification and then reflecting it in the object. And, the portable device may be able to enable the user to naturally read the reflected content in a manner of maintaining the scroll direction of the displayed content.

As mentioned earlier in FIG. 5 and FIG. 6, the portable device may be able to provide a reflection image in a manner of reversing the left and right of the displayed content and then reflecting it in the object. And, the portable device may be able to provide content to the user by changing a scroll direction according to whether the scroll direction of a displayed content is left-right or top-bottom. In particular, in case that the content is scrolled in left or right direction in the first state, the portable device may be able to change the scroll direction of the content to the opposite direction in the second state. And, in case that the content is scrolled in upwards or downwards in the first state, the portable device may be able to maintain the scroll direction of the content in the second state.

Figure 7:
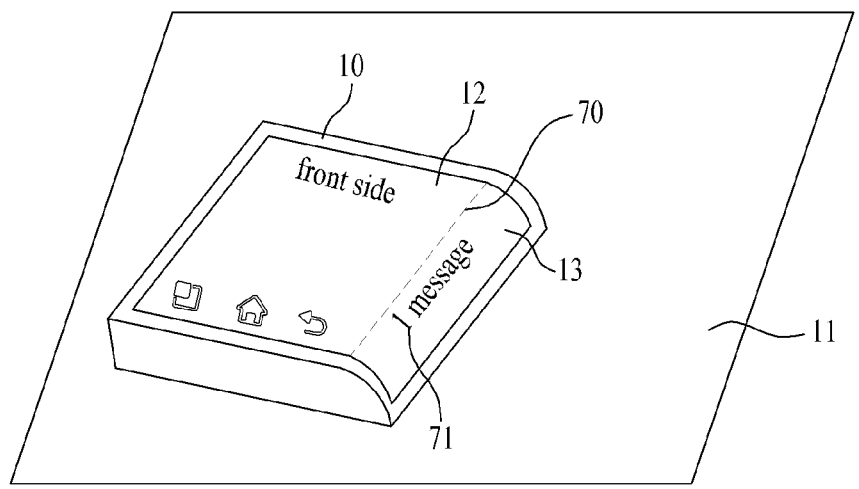
FIG. 7 is a diagram of a displaying position for a content of a portable device according to one embodiment of the present specification.
Figure 7:
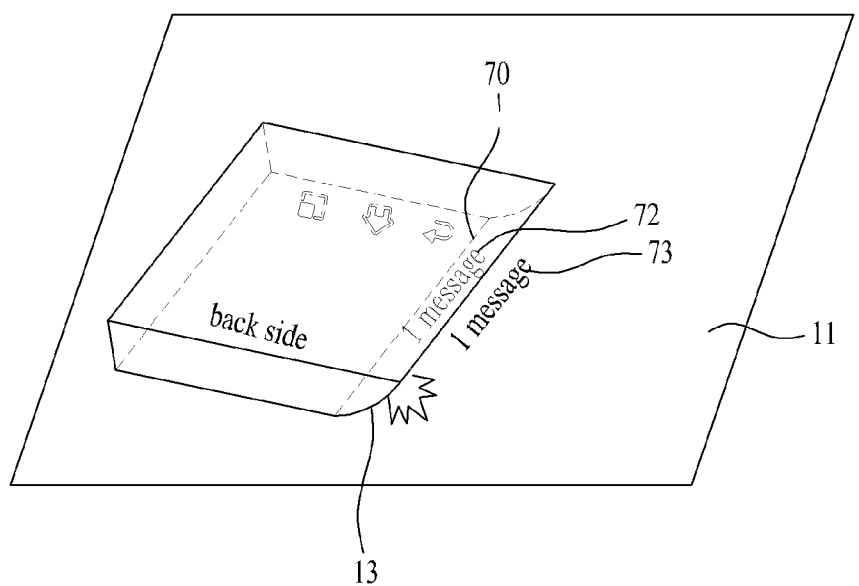

FIG. 7 is a diagram of a displaying position for a content of a portable device according to one embodiment of the present specification. The portable device may be able to control the position of the content displayed in the second display area according to the state of the portable device.

The top of FIG. 7 may indicate a method of displaying the content of the portable device in the first state. The portable device 10 may be able to include the first display area 12 and the second display area 13. The display area of the portable device can be divided into the first display area 12 and the second display area 13 by a boundary line 70.

The portable device may be able to display a content 71 displayed in the second display area 13 at the position near the boundary line 70 in the first state. In case that the portable device is in the first state, a line of vision of a user may be positioned at the front of the portable device. In case that the user gazes at the portable device in front of the portable device, sub areas included in the second display area 13 and situated at the side of the portable device 10 may have different visibilities, respectively. In particular, as shown in the top of FIG. 7, if the second display area 13 of the portable device is a curved surface, a first area near the boundary line 70 may have relatively high visibility compared to other areas among the second display area 13. On the contrary, an area far from the boundary line 70 may have low visibility. Hence, the portable device displays the content 71 to be displayed in the second display area 13 in the first sub area near the boundary line 70 in the first state and may be able to enhance the visibility of the content 71.

The bottom of FIG. 7 may indicate a method of displaying the content of the portable device in the second state. As mentioned earlier in FIG. 4 to FIG. 6, the portable device 10 may be able to display a left-right reversed content 72 in the second display area in the second state. In particular, the portable device may be able to control the content displayed in the second display area to enable a reflection image to be seen as a normal position.

The portable device may be able to display the content 72 displayed in the second display area 13 in a position apart from the boundary line 70 as much as a first distance in the second state. In case that the portable device is in the second state, as shown in FIG. 7, a user may be able to gaze at a reflection image 73, which is a result from reflecting the content displayed in the second display area in an object 11. In this case, the object 11 may corresponds to a floor on which the portable device is laid. In case that the user gazes upon the reflection image 73 reflected in the object 11, the reflection images of the sub areas, which are included in the second display area 13 situated at the side of the portable device 10, may have different visibilities, respectively.

As shown in the bottom of FIG. 7, if the second display area 13 of the portable device is a curved surface, a sub area near the boundary line 70 may have relatively low visibility compared to other areas in the second display area 13. In particular, since a first sub area near the boundary line 70 in the second display area has a very short distance from the floor, it is difficult for a user to check a reflected image. On the contrary, a second sub area apart from the boundary line 70 as much as the first distance in the second display area may have relatively high visibility. Hence, the portable device displays the content 72 to be displayed in the second display area 13 in the second sub area apart from the boundary line 70 as much as the first distance and may be able to enhance the visibility of the reflected image 73.

If the second display area 13 corresponds to a curved surface, the portable device may be able to control the first distance according to curvature. The portable device may be able to configure a sub area forming an angle with a floor in a prescribed range in the second display area 13 as a second sub area. And, when a content is displayed in the second sub area, the portable device may be able to display the content in a manner of compensating for a visual distortion due to the curvature of the curved surface of the second display area.

Figure 8:
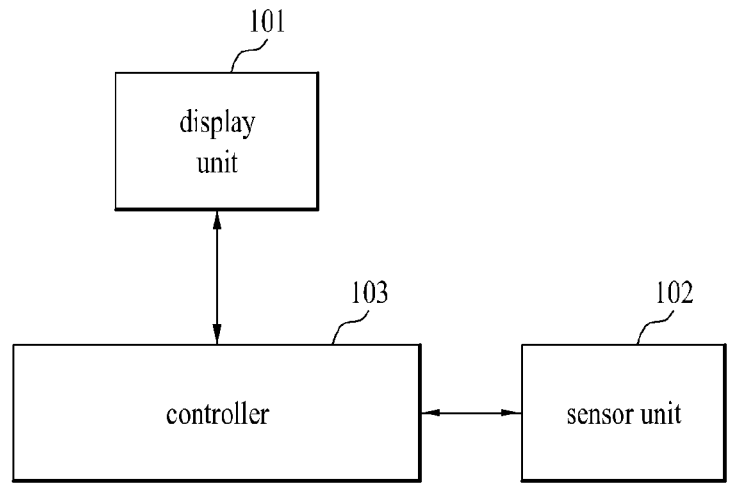
FIG. 8 is a block diagram of a portable device according to one embodiment of the present specification.

FIG. 8 is a block diagram of a portable device according to one embodiment of the present specification. The portable device may be able to include a display unit 101, a sensor unit 102, and a controller 103.

The display unit 101 may be able to include a first display area and a second display area. The display unit 101 may be able to display a digital information. The display unit 101 may be able to include at least one selected from the group consisting of an Organic Light-Emitting Diode (OLED), a Liquid Crystal Display (LCD), an E-ink, and a flexible display.

The first display area can be situated at the front of the portable device and can be used as a main display area. The second display area can be situated at the side of the portable device. The second display area can be positioned in the first display area in a manner of being contiguous or connected. The second display area may have a form of a flat or a curved surface. The second display area can be used for a sub display area.

The sensor unit 102 may be able to sense a state of the portable device. The sensor unit may be able to sense the state of the portable device using at least one selected from the group consisting of a proximity sensor, a light sensor, a gravity sensor, and a gyro sensor. The sensor unit 102 may be able to sense a state that a front of the portable device is laid in a manner of facing upwards or a display area positioned in the front of the portable device is facing a user as a first state of the portable device. And the sensor unit 102 may be able to sense a state that a front of the portable device is laid in a manner of facing downwards or a display area positioned in the front of the portable device is not facing the user as a second state of the portable device. The sensor unit may be able to deliver the information on the sensed state to the controller.

And, the sensor unit 102 may be able to detect a control input controlling a reflection image. In this case, In this case, the control input may include at least one selected from the group consisting of a touch input by a hand of a user, a voice input, and a gesture input. The sensor unit may be able to detect the control input using at least one selected from the group consisting of a proximity sensor, a light sensor, a microphone, and a camera. The sensor unit may be able to deliver the information on the sensed control input to the controller.

And, the sensor unit may be able to sense an attribute of an object in which reflects the content displayed in the second display area. The attribute of the object may include at least one selected from the group consisting of a texture of the object, color, and reflexibility. The sensor unit may be able to deliver the information on the sensed attribute of the object to the controller. The controller may be able to control the property of the content to be displayed using the received attribute of the object.

The controller 103 may be able to control the display unit and the sensor unit. The controller may be able to control a content to be displayed by receiving the information on the state of the portable device from the sensor unit. In case that the state of the portable device is a first state, the controller may be able to provide a first image corresponding to the content to a user in a manner of displaying it in the display unit. And, in case that the state of the portable device is a second state, the controller may be able to display the first image in manner of reversing the left and right of the first image. A second image, which corresponds to a left-right reversed first image, can be reflected in the object using the display unit by the controller. By doing this, a user may be able to check a reflection image, which corresponds to the second image reflected in the object, with vision. As described in FIG. 7, the controller may be able to control the position of the content to be displayed in the second display area according to the state of the portable device. The controller may be able to display the content in an area where the visibility is high in the first state and the second state, respectively.

The controller may be able to control the displayed content by receiving the information on the control input of the portable device from the sensor unit. The controller may be able to display detail content or a next content of the displayed content in response to the control input. And, the controller may be able to delete a currently displayed content or store it in a storing means.

The controller may be able to control the properties of the content to be displayed by receiving the information on reflexibility of the portable device from the sensor unit. The controller may be able to control brightness, size, color, and position of the content in response to the information on the property of the object. The controller may be able to enhance the visibility of a reflection image of the content reflected in the object in a manner of controlling the content.

In case that reflexibility of the sensed object is low, the controller may be able to display content in a manner of increasing the brightness of the content or enlarging the size of the content. In case that the reflexibility of the sensed object is high, the controller may be able to increase the content included per unit area in a manner of reducing the size of the content. And, in case that the texture of the sensed object is rough, the controller may be able to display the content in a manner of enlarging the size of the content. And, in case that the texture of the sensed object is smooth, the controller may be able to increase the content included per unit area in a manner of reducing the size of the content. And, the controller may be able to control the properties of the content to be displayed in a manner of receiving the information on the color of the object. The controller may be able to enhance the visibility of the reflection image in a manner of displaying the content with complementary color of the color of the object.

FIG. 8 is a block diagram of a portable device according to one embodiment of the present specification. Blocks represented as being separated are depicted for elements of the portable device in a manner of being logically distinguished. Thus, the aforementioned elements of the portable device may be equipped with a single chip or a plurality of chips according to a design of the portable device.

Figure 9:
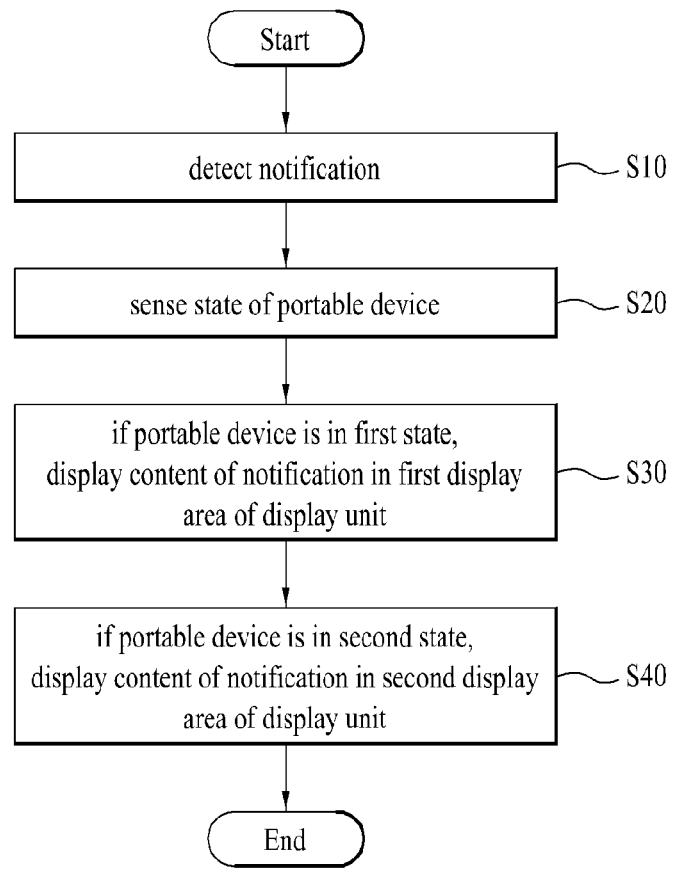
FIG. 9 is a flowchart of a method of controlling a portable device according to one embodiment of the present specification.

FIG. 9 is a flowchart of a method of controlling a portable device according to one embodiment of the present specification. The portable device may be able to detect a notification [S10]. The notification can be generated at a variety of situations for instance, the notification may be generated such a situation as incoming call reception, e-mail reception, message reception, schedule notification, and other alarm occurrence situation. The portable device detects a generation of a notification and may be then able to deliver it to a user. The portable device may be able to provide the content of notification to a user in a manner of displaying it in the display unit.

The portable device may be able to sense the state of the portable device using the sensor unit [S20]. As described in FIG. 8, the portable device may be able to sense whether the portable device is in the first state or the second state using the sensor unit. The portable device may be able to sense a state that a front of the portable device is laid in a manner of facing upwards or a display area positioned in the front of the portable device is facing the user as a first state of the portable device. And, the portable device may be able to sense a state that a front of the portable device is laid in a manner of facing downwards or a display area positioned in the front of the portable device is not facing the user as a second state of the portable device. For instance, in case that the portable device is laid on a desk and the front side of the portable device is facing upwards, the portable device senses the case as the first state. Yet, in case that a different object is put on the front of the portable device in the first state and the display area is covered with the different object, the portable device may sense the case as a second state.

In case that a sensed state corresponds to the first state, the portable device may be able to display the content of the notification in the first display area or the second display area of the display unit [S30]. If the information on the sensed state corresponds to the first state, the portable device may be able to display the content of the notification in the first display area or the second display area of the display unit. The portable device may be able to display a part of content of the notification or a whole content of the notification. In case of displaying the whole content, the portable device may be able to display the whole content in the first display area. In case of displaying a part of content, the portable device may be able to display a part of the content in the second display area. A user may be able to identify the displayed content of the notification by gazing upon the display area of the portable device.

In case that a sensed state corresponds to the second state, the portable device may be able to display the content of the notification in the second display area of the display unit in a manner of reversing the left and right of the content of the notification [S40]. The portable device may be able to reverse the left and right of the content displayed in the second display area in the second state. As described in FIG. 2 and FIG. 4, in case that the portable device is in the second state, instead of gazing upon the display area of the portable device, a user may be able to gaze at a reflection image, which is reflected in a different object by the portable device. In this case, the reflection image reflected in a different object in the second state that the front of the portable device is facing downwards can be identified to a user as a left-right reversed image. Hence, the portable device may be able to display the content of the notification in the second display area in the second state in a manner of reversing the left and right of the content of the notification.

Figure 10:
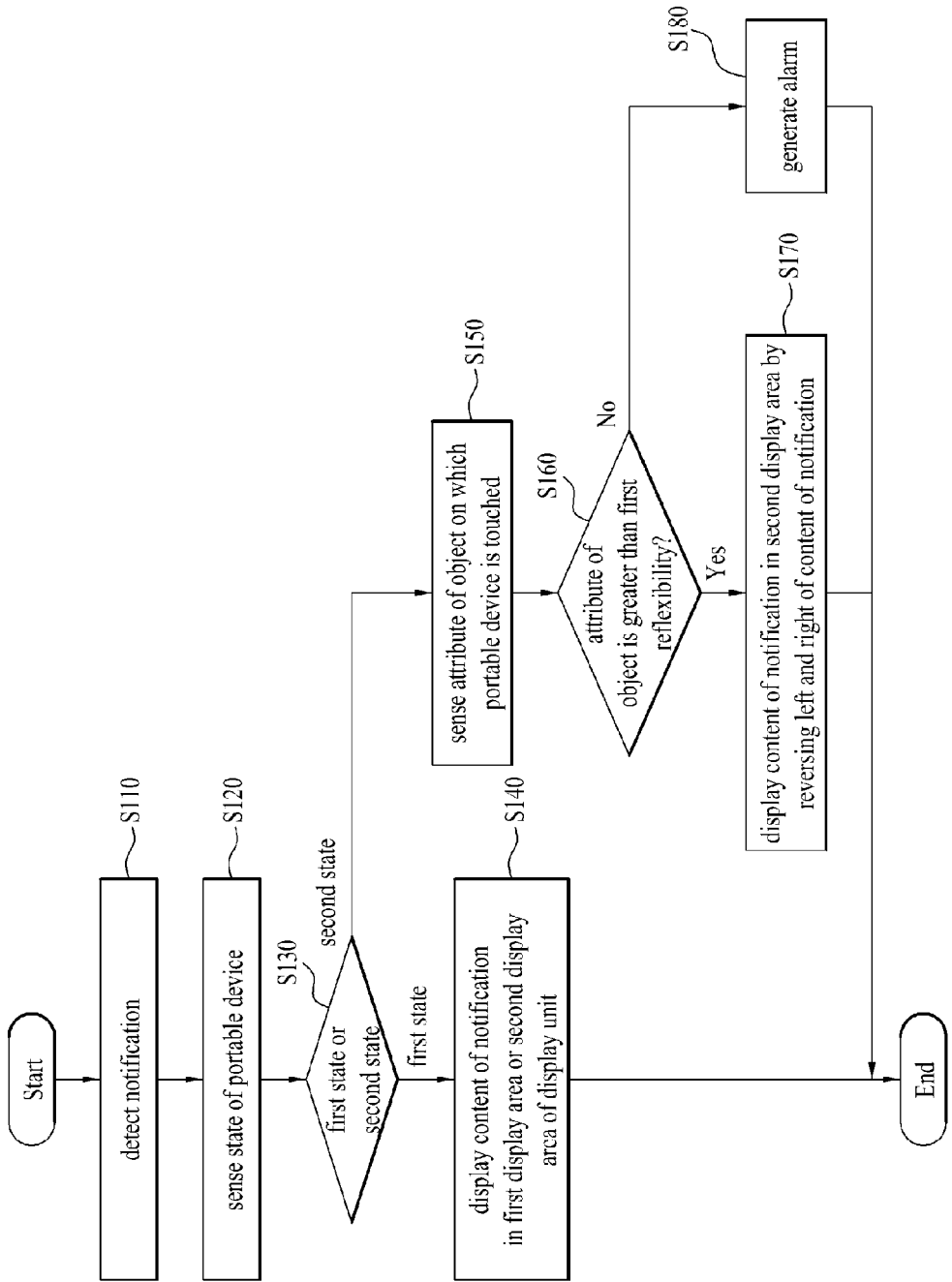
FIG. 10 is a flowchart of a method of controlling a portable device according to a different embodiment of the present specification.

FIG. 10 is a flowchart of a method of controlling a portable device according to a different embodiment of the present specification. The portable device may be able to detect a notification [S110]. The portable device may be able to detect incoming call reception, e-mail reception, message reception, schedule notification, and other alarm generation situation as the notification.

The portable device may be able to sense a state of the portable device using a sensor unit [S120]. As described in FIG. 8, the portable device may be able to sense whether the portable device is in the first state or the second state using the sensor unit. The portable device may be able to sense a state that a front of the portable device is laid in a manner of facing upwards or a display area positioned in the front of the portable device is facing the user as a first state of the portable device. And, the portable device may be able to sense a state that a front of the portable device is laid in a manner of facing downwards or a display area positioned in the front of the portable device is not facing the user as a second state of the portable device.

The portable device may be able to judge the state of the sensed portable device [S130]. The portable device may differently operate according to whether the sensed state is the first state or the second state.

In case that the sensed state corresponds to the first state, the portable device may be able to display the content of the notification in the first display area or the second display area of the display unit [S140]. The portable device may be able to display a summary content of the notification in the first display area. And, the portable device may be able to display detail content of the notification in the second display area. A user may be able to identify the content of the notification displayed in the first display area or the second display area with a vision.

In case that the sensed state corresponds to the second state, the portable device may be able to sense attribute of an object on which the portable device is laid [S150]. As described in FIG. 8, the attribute of the object may include at least one selected from the group consisting of a texture of the object, color, and reflexibility of a surface of the object. In the following description, the reflexibility among the attributes of the object is described with an example. The portable device may be able to sense the reflexibility of the object on which the portable device is laid. The portable device may be able to provide a reflection image reflected in the object to a user in the second state. Hence, the portable device may be able to check whether the visibility of the reflection image is secured in a manner of sensing the reflexibility of the object.

The portable device may be able to judge whether the reflexibility among the attributes of the object is greater than a first reflexibility [S160]. The portable device may operate differently depending on a case that the reflexibility of the object is greater than the first reflexibility or a case that the reflexibility of the object is less than the first reflexibility. In this case, the first reflexibility may mean a minimum reflexibility securing the visibility of the reflection image reflected in the object.

In case that the reflexibility of the object is greater than the first reflexibility, the portable display may be able to display the content of the notification in the second display area in a manner of reversing the left and right of the content of the notification [S170]. If it is judged that the visibility of the reflection image is secured, as described in FIG. 2, the portable device may be able to display the content of the notification in the second display area in a manner of reversing the left and right of the content of the notification. The portable device may be able to provide the content of the notification displayed in a manner of being reversed the left and right of the content to a user by reflecting it in the object. The user may be able to identify the reflection image with vision. Consequently, the user may be able to check the reflection image identical to the content of the notification displayed in the first state.

In case that the reflexibility of the object is less than the first reflexibility, the portable device may be able to generate an alarm [S180]. If it is judged that the visibility of the reflection image is not secured, the portable device may be able to generate an alarm. If the reflexibility of the object corresponds to a value not securing visibility, a reflection image hardly delivers information to a user. Hence, instead of displaying the content of the notification, the portable device generates an alarm. In this case, the alarm may include sound, vibration, and flashing a lamp.

As mentioned in the foregoing description, the portable device may be able to control the content of the notification to be displayed by sensing the state of the portable device. In particular, in case that the portable device is in the second state, visibility and readability of the content can be enhanced by displaying the content in the second display area in a manner of reversing the left and right of the content.

What is claimed is:

1. A portable device, comprising:
a display unit configured to display digital information comprising a first display area situated at a front of the portable device and a second display area situated at a side of the portable device;
a sensor unit configured to sense a state of the portable device; and
a controller configured to:
control the display unit and the sensor unit,
sense the state of the portable device through the sensor unit when a notification is generated,
display a content of the notification in the first display area or the second display area of the display unit if the portable device is in a first state,
display the content of the notification in the second display area by reversing a left and right of the content of the notification,
generate a reflection image by reflecting the content of the notification displayed in the second display area off of an object on which the portable device is laid when the portable device is in a second state,
sense at least one of a first control input and a second control input of a user on the reflection image on the object,
display a next content in response to the first control input on the reflection image, and
delete a content currently displayed in response to the second control input on the reflection image.

2. The portable device of claim 1, wherein the first display area and the second display area are connected to each other.

3. The portable device of claim 1, wherein an internal angle formed by the first display area and the second display area forms a first angle and wherein the first angle has a value greater than 90 degrees and less than 180 degrees.

4. The portable device of claim 1, wherein the second display area is connected to the first display area in a form of a curved surface.

5. The portable device of claim 4, wherein the controller is configured to display the content in the second display area in a manner of compensating a distortion due to curvature of the curved surface.

6. The portable device of claim 1, wherein the first display area of the portable device is facing upwards in the first state.

7. The portable device of claim 1, wherein the first display area of the portable device is facing downwards or contacted with the object in the second state.

8. The portable device of claim 1, wherein the sensor unit is configured to sense the state of the portable device using at least one of a proximity sensor, a light sensor, a camera, a gravity sensor, and a gyro sensor.

9. The portable device of claim 1, wherein the controller is configured to sense the control input using at least one of a microphone, a light sensor, a proximity sensor, and a camera.

10. The portable device of claim 1, wherein the control input comprises at least one of a touch input, a voice input, and a gesture input.

11. The portable device of claim 1, wherein if the portable device is in the second state, the controller is further configured to enhance visibility of a reflection image, which is resulted from reflecting the content, in a manner of controlling the content.

12. The portable device of claim 1, wherein the controller is further configured to detect reflexibility of the object on which the portable device is laid, and
wherein the controller is further configured to display the content in a manner of reversing the left and right of the content if the reflexibility is greater than a first threshold.

13. The portable device of claim 1, wherein if the first display area is within a viewable range of a user, the controller is further configured to judge the portable device as the first state, and
wherein if the first display area is not within a viewable range of a user due to the first display area being blocked by the object, the controller is further configured to judge the portable device as the second state.

14. The portable device of claim 1, wherein the controller is further configured to control a size of the content displayed in response to a sensed texture.

15. The portable device of claim 1, wherein if the portable device is in the first state, the controller is further configured to scroll the content of the notification displayed in the second display area in a first scroll direction, and
wherein if the portable device is in the second state, the controller is further configured to scroll the content of the notification displayed in the second display area in a second scroll direction.

16. The portable device of claim 15, wherein the second scroll direction corresponds to an opposite direction of the first scroll direction.

17. A method of controlling a portable device, the method comprising:
detecting a notification;
sensing a state of the portable device;
displaying a content of the notification in a first display area or a second display area of a display unit if the portable device is in a first state;
displaying the content of the notification in the second display area of the display unit in a manner of reversing a left and right of the content of the notification;
generating a reflection image by reflecting the content of the notification displayed in the second display area off of an object on which the portable device is laid when the portable device is in a second state;
sensing at least one of a first control input and a second control input of a user on the reflection image on the object;
displaying a next content in response to the first control input on the reflection image; and
deleting a content currently displayed in response to the second control input on the reflection image.

* * * * *